W. C. MOORS.
WAGON BRAKE.
APPLICATION FILED NOV. 13, 1908.
931,786.
Patented Aug. 24, 1909.
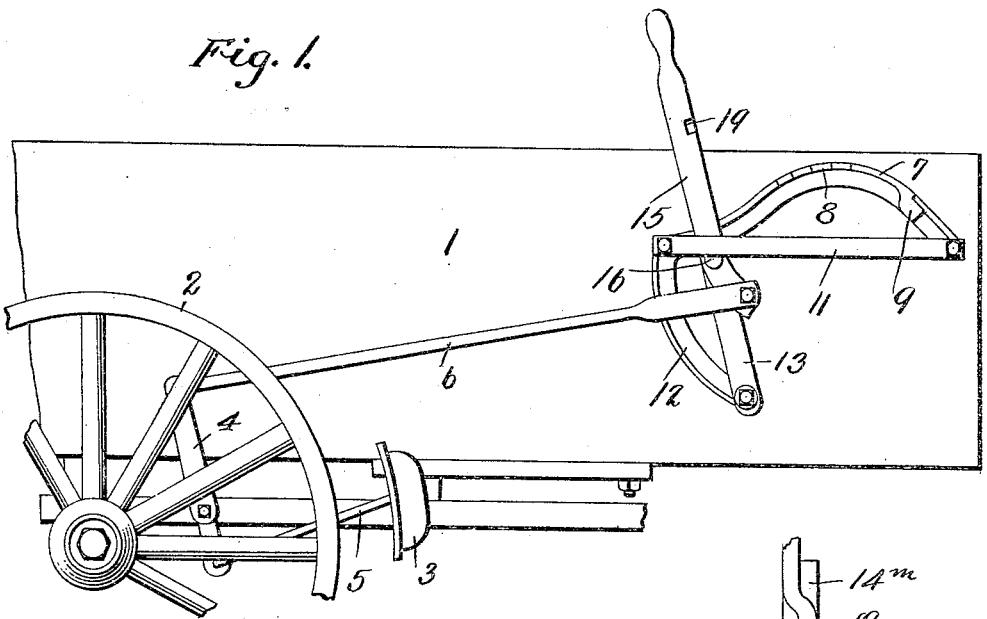
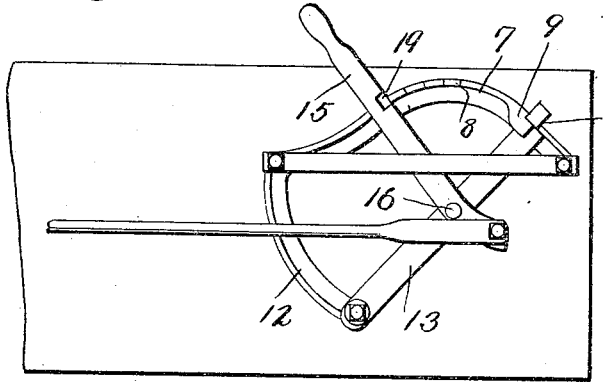
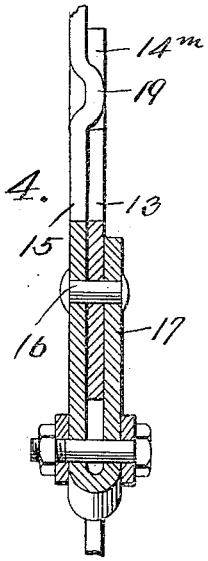
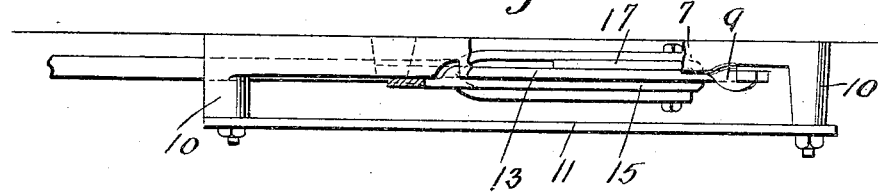
Witnesses
Jos. F. Collins
J. M. Wynkoop
Inventor
Walter C. Moors
By
Attorney

UNITED STATES PATENT OFFICE.

WALTER C. MOORS, OF OWENSBORO, KENTUCKY.

WAGON-BRAKE.

931,786.  Specification of Letters Patent.  Patented Aug. 24, 1909.

Application filed November 13, 1908. Serial No. 462,501.

*To all whom it may concern:*

Be it known that I, WALTER C. MOORS, a citizen of the United States, residing at Owensboro, in the county of Daviess, State of Kentucky, have invented certain new and useful Improvements in Wagon-Brakes, of which the following is a specification.

This invention is an improvement upon the construction of brake shown in my Patents 570,138 issued October 27th, 1896 and No. 892,286 issued June 30th, 1908.

The object of this invention is to produce a brake that will be more effective and simple than the brakes heretofore patented to me; and with this and other objects in view my invention consists of the parts and combination of parts as will be more fully hereinafter set out.

In the drawings Figure 1 is a side elevation of a wagon with my improved brake in position, the parts being shown in the position they assume when the brake is off. Fig. 2 is a similar view, with parts broken away, showing the parts in the position they assume when the brake in applied. Fig. 3 is a top plan view of the brake mechanism detached and parts broken away. Fig. 4 is a detail front elevation of the moving and power levers, parts being broken away.

1 represents a wagon of any approved type, 2 the wheels thereon, 3 the brake shoe, 4 a brake lever, 5 a link connecting the said lever with the shoe, and 6 is a rod extending forward from the link 5.

7 is the top member of the frame, to which I shall refer as the rack bar. This bar is provided with teeth 8 about midway its length inclined toward the rear of the vehicle to which it (the bar) is attached.

9 is a hook or catch secured to the bar near its forward end, and is opened toward the front of the vehicle. The hook opens in a direction opposite to the teeth and it is spaced some distance from the teeth, as will be seen from the drawings. The frame is provided with posts 10 extending sidewise therefrom, to which is secured the bar 11, to be hereinafter referred to.

12 is an arm depending from the frame and curved forwardly.

13 is the moving lever fulcrumed at its lower end on the lower end of the arm 12; the upper end of said moving lever being notched, as at 14, at its upper end. The power lever 15 is fulcrumed at 16 to the moving lever and is provided with a lower depending forwardly extending end with a return bend 17. In this connection attention is called to the fact that the power lever is positioned on the outer face (or side) of the moving lever, thus the moving lever is between the vehicle body and the power lever. This position of the levers, together with positioning the hook 9 on the same bar which carries the rack teeth, simplifies the construction as well as the stroke of the lever, so that it is not necessary for the operator to first push the lever to one side of the ratchet to engage the short or moving lever and then to the other side to engage the power lever—all the teeth and the hook (the retaining means for the levers) being in the same plane, the lever is always operated in the same plane. Having the hook for the moving lever on the ratchet bar, next to the vehicle body makes the ratchet more stable, because none of the strain or power is exerted on or against the outside bar 11. The outside bar 11 is, therefore, made of lighter material than is possible with the constructions shown in my other patents.

The power lever is provided with a lug 19 on its inner face which is constructed to engage the notched end of the moving lever and thus hold the two levers together for simultaneous movement in the forward direction. As soon as the levers complete their first stroke, they are opposite the hook 9 whereupon the levers are drawn toward the rack bar, and the moving lever is engaged and arrested by the said hook as shown in Fig. 2 which disengages the said moving lever from the power lever, whereupon the power lever is free to make its final stroke or strokes, in braking the wagon or vehicle. The fact that the levers are drawn toward the vehicle body, in order that the moving lever may engage the hook 9, makes the stroke of the power lever much easier in applying more power to the brake.

The connecting rod of the brake mechanism is connected to the lower end of the power lever, as will be seen in Fig. 1.

What I claim and desire to secure by Letters Patent is:

1. In a wagon brake, the combination with a bar, teeth formed on said bar, a hook on said bar positioned in advance of said teeth, of a moving lever suitably fulcrumed, a power lever fulcrumed on the outside of said moving lever, a lug on the inside of said power lever constructed to engage the upper end of the moving lever, said moving lever and power lever constructed to move forward in unison until the moving lever is engaged by the said hook, whereupon the power lever is free to move backward independently of the moving lever.

2. In a wagon brake, the combination with a bar having teeth thereon, a hook on said bar in advance of said teeth, and an arm depending from said bar, of a moving lever fulcrumed on said arm at its lower end and provided with a notched upper end, a power lever fulcrumed on the outside face of said moving lever, and a lug on the inside face of the power lever constructed to engage the notched end of the moving lever, whereby the levers are locked together for simultaneous forward movement, and a rod to limit the sidewise movement of said levers.

In testimony whereof I affix my signature in presence of two witnesses.

WALTER C. MOORS.

Witnesses:
C. W. WELLS,
I. C. SUTHERLAND.